United States Patent
Krebs (10) Patent No.: US 11,425,547 B2
(45) Date of Patent: Aug. 23, 2022

(54) MASTER-SLAVE SYSTEM FOR COMMUNICATION OVER A BLUETOOTH LOW ENERGY CONNECTION

(71) Applicant: Bayerische Motoren Werke Aktiengesellschaft, Munich (DE)

(72) Inventor: Alexander Krebs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 169 days.

(21) Appl. No.: 16/967,462

(22) PCT Filed: Feb. 8, 2019

(86) PCT No.: PCT/DE2019/100127
§ 371 (c)(1),
(2) Date: Aug. 5, 2020

(87) PCT Pub. No.: WO2019/158157
PCT Pub. Date: Aug. 22, 2019

(65) Prior Publication Data
US 2021/0227368 A1 Jul. 22, 2021

(30) Foreign Application Priority Data

Feb. 13, 2018 (DE) ...................... 10 2018 202 176.7

(51) Int. Cl.
*H04W 84/20* (2009.01)
*H04W 12/0471* (2021.01)
*H04W 4/80* (2018.01)

(52) U.S. Cl.
CPC .............. *H04W 4/80* (2018.02); *H04W 84/20* (2013.01)

(58) Field of Classification Search
CPC ..... H04W 4/80; H04W 84/20; H04W 12/069; H04W 12/50; H04W 84/12; H04W 52/0212; H04W 52/0219; H04W 12/0471
See application file for complete search history.

(56) References Cited

U.S. PATENT DOCUMENTS

2002/0199110 A1* 12/2002 Kean ....................... G06Q 30/06
713/189
2009/0023455 A1* 1/2009 Gupta ................... H04L 67/101
455/453
(Continued)

FOREIGN PATENT DOCUMENTS

EP 2293524 * 3/2011 ............. H04L 29/12
EP 2 645 665 A1 10/2013
(Continued)

OTHER PUBLICATIONS

International Search Report (PCT/ISA/210) issued in PCT Application No. PCT/DE2019/100127 dated May 21, 2019 with English translation (four (4) pages).
(Continued)

*Primary Examiner* — Andrew Wendell
(74) *Attorney, Agent, or Firm* — Crowell & Moring LLP (57) ABSTRACT

A master-slave system for communication over a Bluetooth Low Energy connection includes at least one slave device and at least one master device. The slave device and the master device are configured to communicate over the Bluetooth Low Energy connection. The slave device has a communication unit and a processing unit, the processing unit of the slave device being configured to generate a first query message with a header field and a payload field, the processing unit of the slave device being further configured to generate a first identity information item based on a first stored key and to save it as the first information item in the header field, and the communication unit of the slave device
(Continued)

being configured to transmit the first query message thus generated to the master device over the Bluetooth Low Energy connection. The processing unit of the slave device is configured to generate at least one second identity information item differing from the first identity information item based on at least one second stored key and to store at least a part of the at least one second identity information item as at least a second information item in the payload field of the first query message.

11 Claims, 3 Drawing Sheets

(56) References Cited

U.S. PATENT DOCUMENTS

| | | | | |
|---|---|---|---|---|
| 2012/0083902 | A1* | 4/2012 | Daum | H04B 3/548 700/3 |
| 2016/0128126 | A1* | 5/2016 | Engelien-Lopes | H04L 1/08 370/329 |
| 2016/0134709 | A1 | 5/2016 | Savolainen | |
| 2017/0374550 | A1* | 12/2017 | Auer | H04B 5/0025 |
| 2018/0047014 | A1* | 2/2018 | Maus | H04L 63/0838 |
| 2019/0098494 | A1* | 3/2019 | Pry | H04W 12/50 |

FOREIGN PATENT DOCUMENTS

| | | |
|---|---|---|
| EP | 2 720 404 A1 | 4/2014 |
| EP | 3 128 790 A1 | 2/2017 |

OTHER PUBLICATIONS

German-language Written Opinion (PCT/ISA/237) issued in PCT Application No. PCT/DE2019/100127 dated May 21, 2019 (eight (8) pages).

German-language Search Report issued in German Application No. 10 2018 202 176.7 dated Jan. 28, 2019 with partial English translation (13 pages).

* cited by examiner

MASTER-SLAVE SYSTEM FOR COMMUNICATION OVER A BLUETOOTH LOW ENERGY CONNECTION

BACKGROUND AND SUMMARY OF THE INVENTION

The invention relates to a master-slave system for communication via a Bluetooth Low Energy connection. In addition, the invention relates to a master device and to a slave device for communication in such a system. In addition, the present invention relates to a motor vehicle, in particular a passenger car, that is a slave device or a master device for communication with a master device or a slave device in a master-slave system.

Devices can communicate via a Bluetooth connection in a wide variety of technical fields. In order to reduce power consumption during the communication, Bluetooth Low Energy (BLE) can be used, for example. BLE is an extension of Bluetooth radio technology. A BLE network has a master device that can communicate with multiple slave devices.

BLE has provision for what are known as advertising channels, which are used to initiate any connection between the devices. To this end, one device, which adopts a slave role, actively sends a request message, called an advertising packet, via an advertising channel at periodic intervals in order to register with another device in the BLE network, which acts as the master of the BLE network. The master can take the request message as a basis for verifying the authenticity of the slave and can subsequently set up a communication between the slave device and the master device.

The slave is registered by using a header field of the request message, which header field stores information referred to as a resolvable private address (RPA). This information allows the slave device to send its identity in encrypted fashion during the registration phase, so that said identity is kept secret from other devices. The information has been encrypted by using a key, known as the identity resolving key (IRK). This key is conveyed to the master beforehand, said master therefore being able to decrypt the received information and to verify an authenticity of the slave.

Since the request message can contain only one header field and hence only one piece of RPA information, it is only possible for a device to use a single request message to register with a single master, i.e. in one BLE network, however. Alternatively, the device can use the same request message to register with multiple masters by virtue of the same message being sent to multiple master devices. However, there is no preservation of anonymity in this case, since the device uses the same IRK key to register with multiple masters, and said key needs to be distributed to all possible connection partners beforehand.

The invention is therefore based on the object of allowing a communication between a slave device and multiple master devices while protecting the identity of the slave device from other devices.

To this end, a master-slave system for communication via a Bluetooth Low Energy connection is proposed. The master-slave system has at least one slave device and at least one master device that are configured to communicate via the Bluetooth Low Energy connection.

The slave device has a communication unit and a processing unit, wherein the processing unit of the slave device is configured to generate a first request message having a header field and a payload field, wherein the processing unit of the slave device is further configured to generate a first piece of identity information on the basis of a first stored key and to store said information as first information in the header field. The information is available in the header field as a resolvable private address (RPA). This first information can be used by the slave device to set up a communication with a master device, as was also possible with the previous request messages.

In order to additionally perform a communication via a BLE connection with further master devices, the processing unit of the slave device is configured to generate at least one second piece of identity information, different than the first identity information, on the basis of at least one second stored key and to store at least part of the at least one second piece of identity information as second information in the payload field of the first request message. The communication unit of the slave device is configured to send the generated first request message to the master device via the Bluetooth Low Energy connection, in particular via the provided advertising channels.

It is therefore possible to use a single request message to request the communication with one (only one piece of information in the header field) or more master device/s (first information in the header field and further second, i.e. second, third and further, information in the payload field). Alternatively, the slave device can register with a master device by using multiple functionalities. These multiple functionalities are represented by the first, the second and optionally further information. By way of example, the slave device can register with a master device as an access point for Internet services by using first identity information and as a telephone or a music service by using second identity information.

During the request process, the encryption of the identity information preserves the anonymity of the slave device from other slave devices or other devices communicating via the same advertising channels. Since the other slave devices and devices are not in possession of the keys, they cannot decrypt the information.

The keys used are in particular identity resolving keys (IRK). These are transmitted to the master devices in the master-slave system beforehand. Preferably, the encryption is a symmetric encryption. Both the slave device and a respective master device have the same key available. The keys allow a secure encrypted transmission of data to take place between the slave device and the master devices.

The IRK keys can be introduced into the master and slave devices by means of an initial "pairing process". In a Bluetooth system, this process can be performed by means of a 2-channel authentication, i.e. radio channel in combination with a visual comparison of a PIN number, on the two devices to be paired, for example. In a BLE system in the vehicle combination, other 2-channel methods are also possible (e.g. radio channel in combination with an NFC card, radio channel in combination with an authenticated online connection), for example. In general, the pairing process is distinguished by the realization of a one-off tap-proof connection by means of which the keys necessary for the further communication of the devices that are to be paired are permanently introduced into the master and slave devices.

Depending on how many master devices the slave device wishes to communicate with and/or how many functionalities the slave device wishes to use to connect to a master device, the payload field can contain one or more pieces of information. As such, for example the processing unit of the slave device can be configured to generate further identity information, different than the first and second identity information, on the basis of further stored keys and to store at least part of the further identity information as further information in the payload field of the first request message.

More than two pieces of information, i.e. second, third, fourth and further information, can be stored in the payload field. By way of example, a piece of information can be reduced to a size of between 1 and 24 bits. In this way, up to 240 pieces of information can be stored in the payload field.

According to one embodiment, the master device has a communication unit and a processing unit, wherein the communication unit of the master device is configured to receive the first request message from the communication unit of the slave device via the Bluetooth Low Energy connection, wherein the processing unit of the master device is configured to decrypt the second and the optionally further information contained in the payload field of the first request message as second identity information, to assign said information to the slave device and to verify an identity of the slave device.

The master device stores a key that can be used to decrypt the received information.

The information can be decrypted by means of a complete comparison of the identity information transmitted in the payload field. For this purpose, the master device extracts the variable component of the first identity information (RPA) indicated in the address field of the request message, which information was created by the slave device by means of a cryptographically secure random number generator. By chaining together the extracted component with each IRK key stored in the master unit and subsequently respectively executing a cryptographic hash function for each resultant chain pair, the master unit generates a volume of separate identity information (RPAs) that is based on the request message of the slave device. The master unit then compares the RPAs that it itself has generated with the RPAs communicated by the slave device by means of the request message. If the comparison results in a concordance arising between an RPA generated by the master device and an RPA conveyed by the slave device in the request message, then the applicable RPA conveyed by the slave device is deemed to have been decrypted. The decrypting IRK is that which was used as input value for the hash function.

After the decryption, the processing unit of the master unit can assign the second and optionally the further decrypted identity information to the slave device and hence verify the identity thereof.

After verification of the slave device, the processing unit of the master device can generate a response message for setting up a communication with the slave device, wherein the communication unit of the master device is configured to transmit the response message to the slave device and wherein the communication unit of the slave device is configured to receive the response message and to take the response message as a basis for setting up a Bluetooth Low Energy communication with the master device.

If the master device was able to authenticate the slave device or has received at least one volume of identity information sufficient therefor, it can return a response message to the slave device. On the basis of the response message, the slave device can initiate setup of the Bluetooth Low Energy communication between the slave device and the master device.

The master-slave system can have further master devices, which are of identical design to the first master device. This means that the further master devices likewise have a communication unit and a processing unit, wherein the communication units of the further master devices are configured to receive the first request message from the communication unit of the slave device via the Bluetooth Low Energy connection, and wherein the processing units of the further master devices are configured to decrypt the further information contained in the payload field of the first request message as further identity information and to assign said information to the slave device.

According to a further embodiment, the processing unit of the slave device is configured to divide the at least one second piece of identity information into a plurality of blocks and to store a first subgroup of the blocks as at least second information in the payload field of the first request message.

The payload field can have a length of between 0 and 41 bytes, for example. In contrast to the first information, the length of which (6 bytes) is fixed, the length of the second information can be varied and can contain between 1 and 41 bytes. Other values are likewise possible. In particular if the slave device wishes to communicate with multiple master devices, the second information can be reduced or compressed in order to accommodate multiple pieces of information in the payload field.

The information can be computed as a hash function, for example, on the basis of the key and the respective identity information. In one embodiment, no more than the 24 most significant bits of the computed hash function are used for the information that is to be transmitted.

The processing unit of the master device can decide whether the blocks received with the first request message are sufficient for verifying the slave device, and, if so, can take the first subgroup of the blocks as a basis for verifying the identity of the slave device.

According to a further implement, the processing unit of the slave device is configured to generate a second or multiple further request message/s and to store a second or multiple further subgroup/s of the blocks as second or further information in the payload field. The second or the further request message/s are preferably sent at a time after the first request message.

If the identity of the slave device was not able to be verified by the master device on the basis of the first request message, the communication unit of the master device can actively request the second request message or passively wait for a further request message and can receive said message. The processing unit of the master device is in this case configured to take the first and second subgroups of the blocks as a basis for verifying the identity of the slave device.

If the slave device was not able to be verified, or if the slave device has not yet received a response message from the master device, the processing unit of the slave device can generate a third request message, which stores a third subgroup of the blocks as second information in the payload field, and can send said message to the master device.

The communication unit of the master device can receive the third request message, and the processing unit of the master device can take the first, the second and the third subgroup of the blocks as a basis for verifying the identity of the slave device.

This process can be continued with further request messages, which contain further subgroups of the second identity information, until the master device has sufficient information in order to verify the slave device.

This means that, in addition to the first request message, any number of further request messages can be sent. Every further request message can include a further subgroup of the identity information. The slave device can therefore split the subgroups of a single piece of identity information over multiple request messages.

At the reception end, the master device can decide how many pieces of information it needs about a slave device before it can decide that the slave device is sufficiently authenticated. This can be dependent on the functionality that is supposed to be performed by means of the communication between the slave device and the master device, for example. For functionalities with little security relevance, such as for example music services, just a small volume of information, and hence a low probability of correct verification, can suffice. By contrast, security-relevant functionalities, such as for example access to personal data, can require a larger volume of information, and hence a high probability of correct verification.

The processing unit of the master device can therefore decide whether the received information is already sufficient in order to verify the identity of the slave device, or whether further information is required. If the processing unit of the master device has received a sufficient volume of information in order to verify the slave device, the communication unit of the master device can convey a message to the slave device indicating that no further information is required. This message can be provided as part of the response message for setting up the communication with the slave device, for example. This response message can also stop the automatic sending of further request messages. Alternatively, the sending of further request messages can be continued.

As already illustrated, the communication unit of the slave device can send a plurality of request messages. According to one embodiment, the communication unit of the slave device is configured to terminate a sending of the request message if a predefined termination event occurs.

The communication unit of the slave device can transmit request messages containing information until the termination event occurs. Each request message contains a further subgroup of the identity information. If all subgroups have been sent, the process can begin again with the first subgroup. The slave device can generate an almost infinite number of subgroups, however.

The predefined termination event can be the response message of the master device, for example. If communication setup is initiated by the response message, the slave device can stop sending the request messages. A further termination event can be a predefined period that has elapsed since the beginning of the first request message being sent. In addition, the termination event can be the sending of the last subgroup of the identity information.

If the communication is set up with one of multiple master devices, the slave device can send further request messages without the information for the master device with which communication already takes place. The sending of the request messages is thus not terminated completely, but rather the request messages are merely sent without the information associated with the already connected master device.

According to a further aspect, a motor vehicle, in particular a passenger car, is proposed. The motor vehicle can represent either the slave device or the master device in a master-slave system as described above. The corresponding master or slave device for communication with the motor vehicle can be a mobile device, such as for example a smartphone, tablet PC or the like.

In addition, a method for communication via a Bluetooth Low Energy connection in a master-slave system is proposed. The method has the following steps:

generating a first request message having a header field and a payload field, wherein first identity information is generated on the basis of a first stored key and is stored as first information in the header field, generating at least one second piece of identity information, different than the first identity information, on the basis of at least one second stored key, and storing at least part of the second identity information as second information in the payload field of the first request message, and sending the generated first request message to a master device via the Bluetooth Low Energy connection.

At the reception end, i.e. in the master device, the first request message can be received. Subsequently, the at least second information contained in the payload field of the first request message can be decrypted as second identity information and assigned to the slave device, and an identity of the slave device can be verified.

The embodiments and features described for the proposed master-slave system apply to the proposed method accordingly.

Furthermore, a computer program product is proposed that has a program code designed to prompt performance of the method as explained above on a computer.

A computer program product, such as e.g. a computer program means, can be provided or supplied for example as a storage medium, such as e.g. a memory card, USB stick, CD-ROM, DVD, or else in the form of a downloadable file from a server in a network. This can be effected in a wireless communication network, for example, by the transmission of a corresponding file with the computer program product or the computer program means.

Further possible implementations of the invention also encompass combinations not explicitly mentioned of features or embodiments described above or below in relation to the exemplary embodiments. In this case, a person skilled in the art will also add individual aspects as improvements or supplementations to the respective basic form of the invention.

Further advantages and advantageous embodiments are indicated in the description, the drawings and the claims. The combinations of features indicated in the description and in the drawings, in particular, are purely exemplary, with the result that the features may also be present individually or in other combinations.

The invention will be described in more detail below on the basis of exemplary embodiments depicted in the drawings. The exemplary embodiments and the combinations shown in the exemplary embodiments are purely exemplary and are not intended to define the scope of protection of the invention. This is defined solely by the appended claims.

In the text below, elements that are identical or act in functionally identical fashion are denoted by the same reference signs.

DETAILED DESCRIPTION OF THE DRAWINGS

Figure 1:
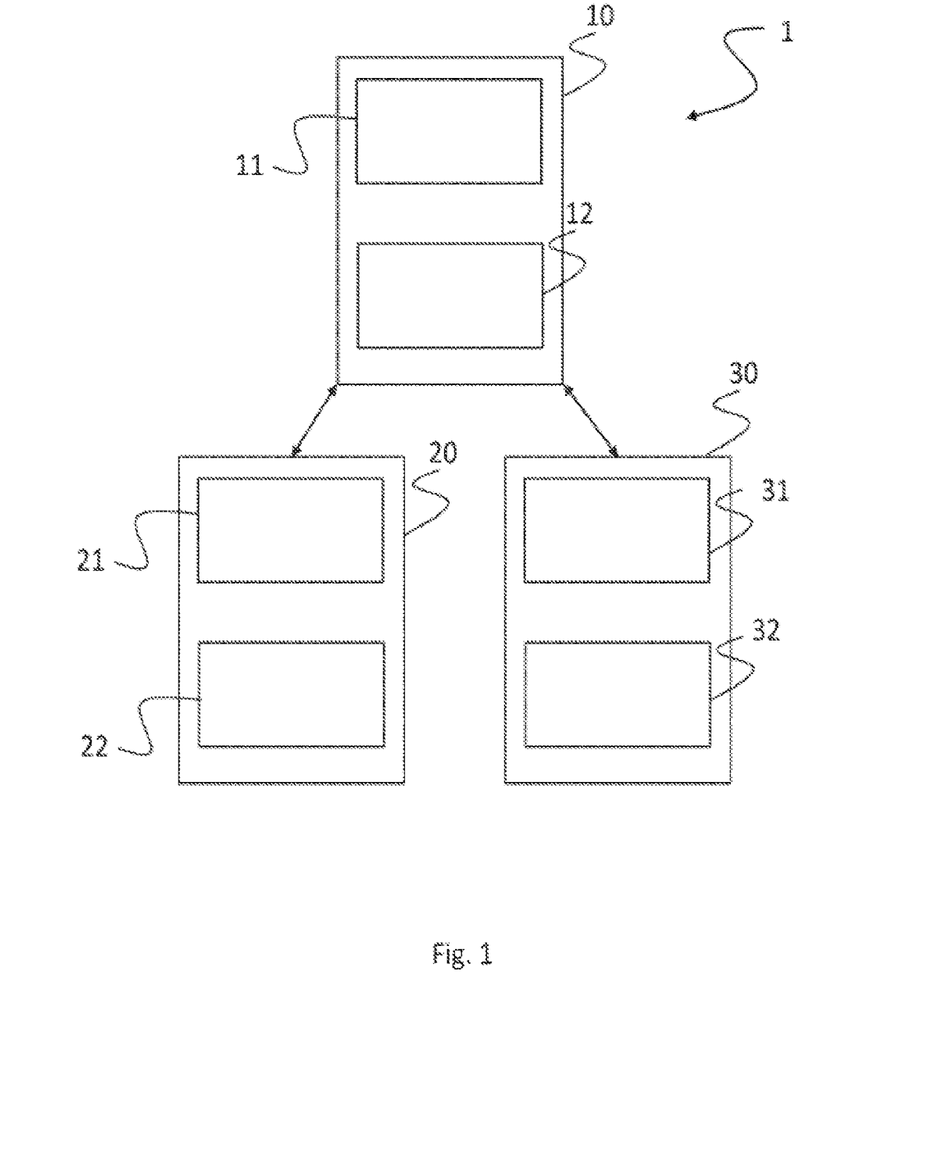
FIG. 1 shows a master-slave system having a slave device and two master devices.

FIG. 1 shows a master-slave system 1 having a slave device 10 and two master devices 20, 30. There may also be provision for only one master device 20 or any number of further master devices.

The slave device 10 has a communication unit 11 and a processing unit 12. The master devices 20, 30 likewise each have a communication unit 31, 31 and a processing unit 22, 32.

In order to start a communication with one or both master devices 20, 30 via a Bluetooth Low Energy connection, the slave device 10 first needs to send a request message 40 to the master devices 20, 30. This request message 40 can be sent via advertising channels, as provided for Bluetooth Low Energy, before the actual communication.

Figure 2:
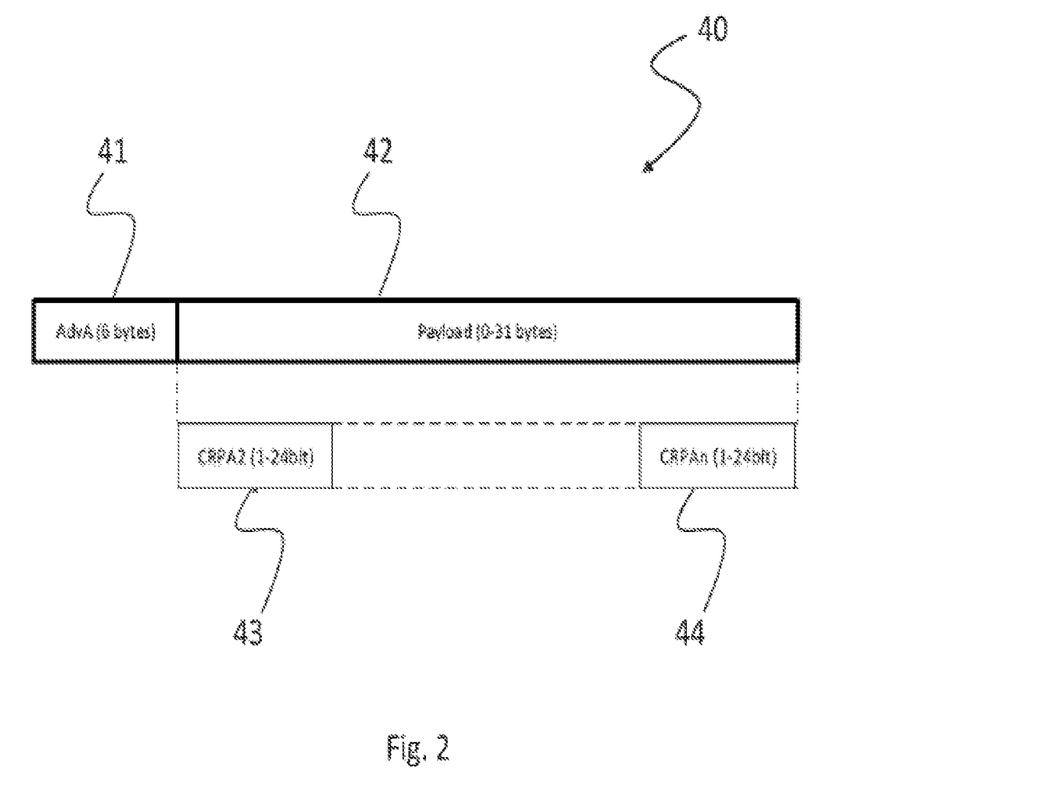
FIG. 2 shows an example of a request message generated by the slave device of FIG. 1.

If only a communication with a single master device 20 is desired, the slave device 10 can convey its own identity in a header field 41 of the request message 40, as shown in FIG. 2. If the communication is supposed to be set up with more than one master device 20, 30, however, the slave device 10 can transmit a request message 40 that contains multiple pieces of identity information 43, 44.

For this purpose, the processing unit 12 generates the request message 40 having the header field 41 and a payload field 42, wherein first identity information generated on the basis of a first key is stored as first information in the header field 41.

Additionally, the processing unit 12 generates at least one second piece and optionally multiple pieces of identity information, different than the first identity information, on the basis of a second or further keys and stores at least part of the second identity information as second information 43 in the payload field 42. If the slave device 10 wishes to set up a communication with multiple master devices 20, 30, the payload field 42 can have up to n pieces of identity information 43, 44. Each piece of identity information is encrypted by using a separate key. The keys can be interchanged between the slave device 10 and the respective master devices 20, 30 beforehand.

After the request message 40 has been generated, the communication unit 12 transmits the generated request message 40 to the master devices 20, 30 via the advertising channels.

In order to be able to store a plurality of pieces of information 43, 44 in the payload field 42, the processing unit 12 can split each of the second and further pieces of identity information into a plurality of blocks. A first subgroup of the blocks of the second or further identity information is then stored as second information 43 in the payload field 42 of the first request message 30. Analogously, a first group of blocks from each further piece of identity information is stored as identity information 44 in the payload field 42.

The payload field 42 can have a length of between 0 and 41 bytes, for example. In contrast to the first information, the length of which (6 bytes) is fixed, the length of the second information 43, 44 can be varied and can contain between 1 and 41 bytes. In particular if the slave device 10 wishes to communicate with multiple master devices 20, 30, the second information 43, 44 can be reduced or compressed in order to accommodate multiple pieces of information 43, 44 in the payload field 42.

If only a first subgroup of the respective identity information is contained in the information 43, 44, the processing unit 12 can generate further request messages 40 containing the further subgroups of the identity information in the information 43, 44.

The request messages 40 are received by the communication units 21, 31 of the master devices 20, 30. The processing units 22, 32 examine the information contained in the header field 41 and the payload field 42. If the processing units 22, 32 detect second information 43, 44 intended for them, the second or further information 43, 44 is decrypted as second or further identity information by using a stored key and is assigned to the slave device 10.

The processing units 22, 32 verify an identity of the slave device 10 on the basis of the second identity information and on the basis of the stored key. If only one subgroup of the identity information was transmitted, the respective processing unit 22, 32 can decide whether the received information is already sufficient for verifying the slave device 10. If this is not the case, the communication unit 21, 31 of the applicable master device 20, 30 can receive a further request message 40 that has a second subgroup of the identity information as second information 43, 44 in the payload field 42.

As soon as the processing unit 22, 32 has sufficient information about the identity of the slave device 10 in order to verify the latter with a prescribed probability, the processing unit 22, 32 can generate a response message that is transmitted by the communication unit 21, 31 to the slave device 10.

If the communication unit 11 of the slave device 10 receives a corresponding response message from one of the master devices 20, it can take this response message as a basis for setting up a Bluetooth Low Energy communication with the applicable master device 20.

The number of request messages 40 needed can be dependent on the respective master device 20, 30. After a predefined termination event, the slave device 10 can terminate the transmission of request messages without setting up a communication connection. Such a termination event can occur for example if all subgroups of the identity information were transmitted without a response message having been received.

Figure 3:
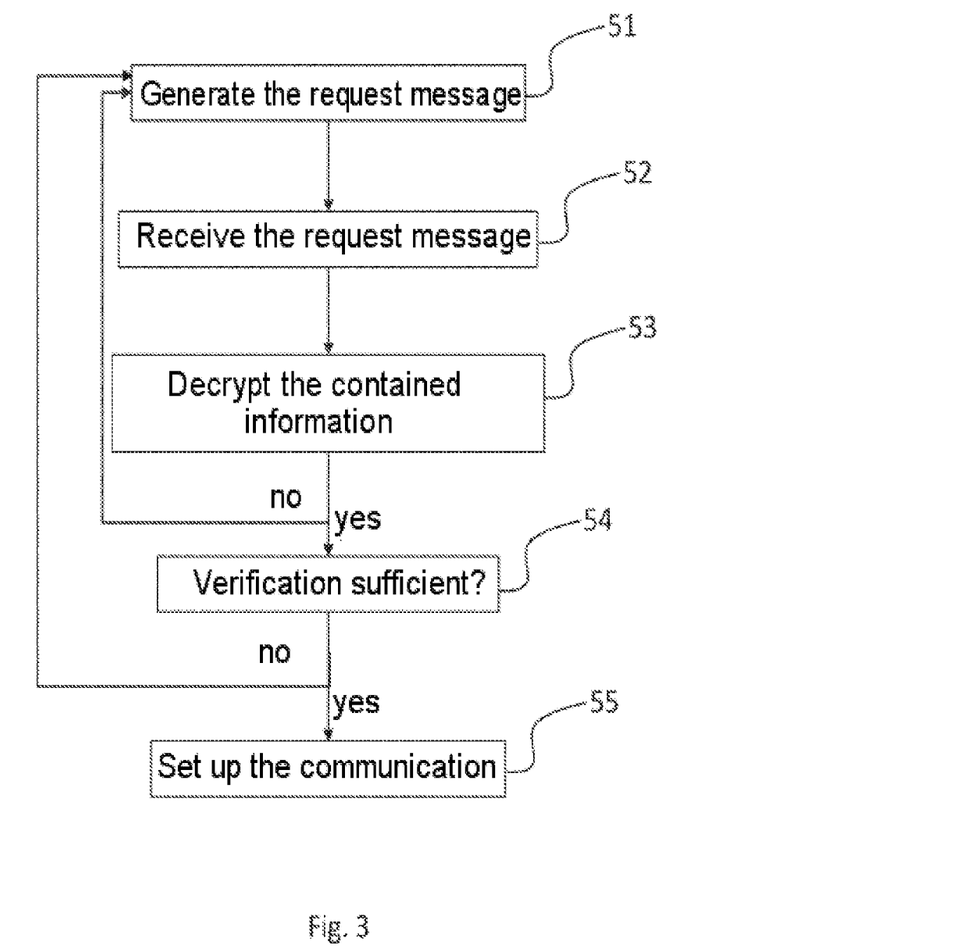
FIG. 3 shows a schematic flowchart for the setup of a communication in the master-slave system of FIG. 1.

The sequence of communication setup is illustrated once again in FIG. 3.

First, a request message 40 is generated in a first step 51. This request message 40 can contain, as illustrated above, one or more pieces of information in a payload field 42 that are each assigned to a master device 20, 30. The reception of the request message 40 by a master device 20 is described below. This is effected analogously for every further master device 30.

In a second step 52, the request message 40 is received and the information 43 contained therein is subsequently decrypted in step 53 as described above. If the master device 20 is not able to decrypt the information 43, the master device 20 can wait for a further request message 40. This can be the case for example if the information 43, 44 contained in the request message 40 is not intended for the master device 20 and the latter therefore does not have an appropriate key.

If the information 43 was decrypted, the master device 20 decides in a step 54 whether the identity information is sufficient for verifying the slave device 10. This can be dependent on the functionality that is supposed to be performed by means of the communication between the slave device 10 and the master device 20, for example. For functionalities with little security relevance, such as for example music services, just a small volume of information, and hence a low probability of correct verification, can suffice. By contrast, security-relevant functionalities, such as for example access to personal data, can require a larger volume of information, and hence a high probability of correct verification.

If the verification is not sufficient, the master device 20 waits for further request messages 40 having further subgroups of the identity information. The method is then continued with steps 51 to 54 until the information is sufficient for verification.

If this is the case, a communication is set up between the slave device 10 and the master device 20 in step 55. To this end, the master device 20 can send a response message to the slave device 10 in order to initiate the communication setup, as described above.

The figures describe the circumstance that a single request message 40 is used to request the communication with multiple master devices 20, 30. Alternatively or additionally, the slave device 10 can register with a single master device 20 by using multiple functionalities. These multiple functionalities are represented by the first and second information. By way of example, the slave device 10 can register with a master device 20 or the master devices 20, 30 as an access point for Internet services by using first identity information and as a telephone or a music service by using second identity information. The sequence is analogous to that described above, wherein the master devices 20, 30 each decrypt multiple pieces of information by using multiple keys.

The proposed master-slave system allows a slave device not just to request communication with one master device. Rather, the slave device can use a single message to transmit a request for communication setup to multiple master devices at the same time.

REFERENCE SIGNS

1 Master-slave system
10 Slave device
11 Communication unit
12 Processing unit
20 Master device
21 Communication unit
22 Processing unit
30 Master device
31 Communication unit
32 Processing unit
40 Request message
41 Header field
42 Payload field
43 Second information
44 n-th information
51-55 Method steps

What is claimed is:

1. A master-slave system for communication via a Bluetooth Low Energy connection, comprising:
at least one slave device and at least one master device, wherein the slave device and the master device are configured to communicate via the Bluetooth Low Energy connection, wherein
the slave device has a communication unit and a processing unit,
the processing unit of the slave device is configured to generate a first request message having a header field and a payload field,
the processing unit of the slave device is further configured to generate first identity information based on a first stored key and to store said information as first information in the header field,
the processing unit of the slave device is further configured to generate at least one second piece of identity information, different than the first identity information, based on at least one second stored key and to store at least part of the at least one second piece of identity information as at least second information in the payload field of the first request message, and
the communication unit of the slave device is configured to send the generated first request message to the master device via the Bluetooth Low Energy connection.

2. The master-slave system according to claim 1, wherein
the processing unit of the slave device is configured to generate further identity information, different than the first and second identity information, based on further stored keys and to store at least part of the further identity information as further information in the payload field of the first request message.

3. The master-slave system according to claim 1, wherein
the master device has a communication unit and a processing unit,
the communication unit of the master device is configured to receive the first request message from the communication unit of the slave device via the Bluetooth Low Energy connection, and
the processing unit of the master device is configured to decrypt the at least one second piece of information contained in the payload field of the first request message as second identity information, to assign said information to the slave device and to verify an identity of the slave device.

4. The master-slave system according to claim 3, wherein
the processing unit of the master device is configured so as, after verification of the slave device, to generate a response message for setting up a communication with the slave device,
the communication unit of the master device is configured to transmit the response message to the slave device, and
the communication unit of the slave device is configured to receive the response message and to take the response message as a basis for setting up a Bluetooth Low Energy communication with the master device.

5. The master-slave system according to claim 1, wherein
the processing unit of the slave device is configured to divide the at least one second piece of identity information into a plurality of blocks and to store a first subgroup of the blocks as at least second information in the payload field of the first request message.

6. The master-slave system according to claim 5, wherein
the processing unit of the master device is configured to decide whether the received blocks are sufficient for verifying the slave device, and, if so, to take the first subgroup of the blocks as a basis for verifying the identity of the slave device.

7. The master-slave system according to claim 5, wherein
the processing unit of the slave device is configured to generate a second or multiple further request message/s and to store a second or multiple further subgroup/s of the blocks as second or further information in the payload field.

8. The master-slave system according to claim 7, wherein
if the identity of the slave device is not verified, the communication unit of the master device is configured to request and/or receive the second or further request message/s, and
the processing unit of the master device is configured to take the first and second or further subgroup/s of the blocks as a basis for verifying the identity of the slave device.

9. The master-slave system according to claim 1, wherein
the communication unit of the slave device is configured to terminate a sending of the request message if a predefined termination event occurs.

10. The master-slave system according to claim 1, wherein
either the master device or the slave device is a motor vehicle.

11. The master-slave system according to claim 10, wherein
the motor vehicle is a passenger car.

* * * * *